UNITED STATES PATENT OFFICE.

JOHN H. DAY, OF ALBANY, NEW YORK.

PROCESS OF MAKING DRY FLOUR-PASTE.

SPECIFICATION forming part of Letters Patent No. 406,270, dated July 2, 1889.

Application filed December 10, 1888. Serial No. 293,196. (Specimens.)

*To all whom it may concern:*

Be it known that I, JOHN H. DAY, a citizen of the United States, residing at Albany, in the county of Albany and State of New York, have invented a new and useful Process of Manufacturing Paste in a Dry Form; and I do hereby declare that the following is a full, clear, and exact description of the invention, which will enable others skilled in the art to which it appertains to make and use the same.

The objects of my invention are to provide a process of manufacturing common paste into a dry form, preserving its strength intact, rendering it easily and conveniently stored and transported and readily and quickly adapted for use.

It is a fact well known to those engaged in the business of hanging wall-paper, in making paper bags, or in any business requiring the use of paste in large quantities, that a very considerable amount of that substance is wasted because it becomes sour and caked after standing for a time, that it emits a sickening stench, draws vermin, and is a constant source of annoyance; it is difficult to transport because of its weight; it requires some time and considerable experience to make good paste, and is therefore usually made, among paper-hangers at the store by those capable of making it, and carried from there to the place where the work is to be performed. In order to obviate these difficulties, I make the paste in the usual manner and feed it through a slot or opening into a suitable box, usually cylindrical in form, into which box is forced in any ordinary manner hot air from a lamp, furnace, or other source of heat, which coming into contact with the paste as it is fed into the box the moisture in the paste is very rapidly expelled by evaporation, the residue being a hard dry substance. The water may be expelled from the paste by placing the substance into evaporating-pans or suitable receptacles and applying to them heat in such a degree that the water will be rapidly evaporated, leaving the residue in the same dry state as before mentioned. Care must be taken not to burn or bake the substance, and the water must be evaporated rapidly and entirely, otherwise a gluey substance will remain, similar to that found in a paste-pot when the contents have partially evaporated, a worthless sticky mass. When the water has been expelled from it, the paste is hard and dry. This substance I put either into the form of a cake or bar by pressing it by any suitable means, or grind it to a fine powder by placing it into an ordinary grinding-machine. I prefer the powder because it dissolves much more quickly. Having thus reduced the paste to the dry form, there is no difficulty whatever in keeping it in store. It takes but little space, does not smell, does not spoil, and attracts vermin no more than an article of food does. It can be transported easily, can be put into little boxes and sold, and the buyer, though inexperienced, can make his own paste. In sending men to hang paper, instead of giving them pails of paste to carry, they can make the paste at the place where the work is to be done by simply carrying in a paper a sufficient quantity of the powdered paste made by an experienced paste-maker.

My powdered paste will dissolve quickly in either cold or hot water, and the paste thus made will be equally strong and in as good condition as when first made, although it may have been in the dry state for months and even years.

My process is extremely simple and inexpensive in its operation, and the product I obtain is a new article of manufacture of great importance and utility.

What I claim as my invention is—

The process of manufacturing flour-paste into a dry form by feeding liquid paste through a suitable slot into a cylindrical receptacle at or near the top thereof, and forcing hot air into contact with the paste as it is fed into the receptacle, rapidly eliminating the water therefrom by evaporation, the paste dropping on the bottom of said receptacle in a dry form, substantially as described.

JOHN H. DAY.

Witnesses:
FREDERICK W. CAMERON,
WALTER E. WARD.